US011623758B2

(12) United States Patent
Terry et al.

(10) Patent No.: US 11,623,758 B2
(45) Date of Patent: Apr. 11, 2023

(54) LATTICE STRUCTURE CUSHIONS FOR AIRCRAFT FUEL SYSTEMS

(71) Applicant: Textron Innovations Inc., Providence, RI (US)

(72) Inventors: Eric Christopher Terry, Fort Worth, TX (US); Timothy Brian Carr, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 276 days.

(21) Appl. No.: 16/805,962

(22) Filed: Mar. 2, 2020

(65) Prior Publication Data

US 2021/0269169 A1    Sep. 2, 2021

(51) Int. Cl.
| *B64D 37/06* | (2006.01) |
| *B64D 37/04* | (2006.01) |
| *B64C 27/04* | (2006.01) |
| *B33Y 80/00* | (2015.01) |

(52) U.S. Cl.
CPC ............ *B64D 37/06* (2013.01); *B64D 37/04* (2013.01); *B33Y 80/00* (2014.12); *B64C 27/04* (2013.01)

(58) Field of Classification Search
CPC ........ B64D 37/02; B64D 37/04; B64D 37/06; B64D 2041/005; B64D 37/005; B64G 1/423; B33Y 88/00; B33Y 80/00; H01M 8/00; H01M 8/24; H01M 8/247; H01M 8/2475; H01M 2250/20
See application file for complete search history.

(56) References Cited

U.S. PATENT DOCUMENTS

| 5,451,015 | A | * | 9/1995 | Cronkhite | .............. | B64D 37/04 |
| | | | | | | 244/135 R |
| 6,176,452 | B1 | * | 1/2001 | Gallegos | ................ | B60K 15/00 |
| | | | | | | 244/135 B |
| 7,144,030 | B2 | * | 12/2006 | Buell | ....................... | B62J 27/30 |
| | | | | | | 180/219 |
| 10,196,151 | B2 | | 2/2019 | Peryea et al. | | |
| 10,301,032 | B2 | | 5/2019 | Carr et al. | | |
| 2005/0001100 | A1 | * | 1/2005 | Hsi-Wu | ............. | B29C 44/1228 |
| | | | | | | 244/172.2 |
| 2006/0033322 | A1 | * | 2/2006 | Suess | ..................... | B60K 15/07 |
| | | | | | | 280/830 |
| 2011/0210096 | A1 | * | 9/2011 | Raji | ......................... | C23F 1/08 |
| | | | | | | 216/49 |

(Continued)

OTHER PUBLICATIONS

Siceloff, Steven. "Second Starliner Begins Assembly in Florida Factory." NASA. Jun. 6, 2016, available at https://www.nasa.gov/feature/second-starliner-begins-assembly-in-florida-factory (Year: 2016).*

(Continued)

*Primary Examiner* — Joshua J Michener
*Assistant Examiner* — Ka Chun Leung
(74) *Attorney, Agent, or Firm* — Shackelford, Bowen, McKinley & Norton, LLP

(57) ABSTRACT

An exemplary cushion for a fuel system is constructed of a lattice structure formed of a material that is substantially nonabsorbent of fuel and has a network of nodes and beams defining cells, an exterior surface of the lattice structure is configured to be oriented toward a fuel cell and an interior surface of the lattice structure is configured to fit to a mounting surface.

13 Claims, 6 Drawing Sheets

(56) References Cited

U.S. PATENT DOCUMENTS

2018/0244397 A1* 8/2018 Carr .................. B64D 37/02
2019/0118486 A1* 4/2019 Compton ............ B28B 1/001

OTHER PUBLICATIONS

Tate, Karl. "Boeing's CST-100 Starliner Space Capsule (Infographic)." Space.com. Apr. 24, 2012, available at https://www.space.com/15363-boeing-space-capsule-cst-100-infographic.html (Year: 2012).*

Caliendo, Heather. "Orion Space Capsule Will be 3D-Printed Onsite at RAPID 2016." Plastic Technology. Mar. 14, 2016, available at https://www.ptonline.com/blog/post/orion-space-capsule-will-be-3d-printed-onsite-at-rapid-2016 (Year: 2016).*

* cited by examiner

LATTICE STRUCTURE CUSHIONS FOR AIRCRAFT FUEL SYSTEMS

TECHNICAL FIELD

This disclosure relates in general to the field of aircraft, and more particularly, but not by way of limitation, to fuel cell cushions to protect fuel cells in an aircraft fuel system from damage caused by protrusions, crashes or other hazards.

BACKGROUND

This section provides background information to facilitate a better understanding of the various aspects of the disclosure. It should be understood that the statements in this section of this document are to be read in this light, and not as admissions of prior art.

Among other responsibilities, the United States Federal Aviation Federation (FAA) established airworthiness standards for aircraft such as airplanes and rotorcraft and provides airworthiness approval for aircraft, aircraft engines, propellers and related articles which certifies that they conform to an approved design and are in a condition for safe operation. More specifically, part 29 of the FAA regulations is directed to airworthiness standards for transport rotorcraft, which includes section 29.952 that is directed to fuel system crash resistance. This section details design features for fuel systems intended to minimize the hazard of fuel fires to occupants following an otherwise survivable impact such as a crash landing. In addition, this section states that fuel systems must be shown to be capable of sustaining certain static and dynamic deceleration loads, considered as ultimate loads acting alone, measured at the system component's center of gravity without structural damage to the system components, fuel tanks or their attachments that could leak fuel to an ignition source.

One of the requirements for obtaining rotorcraft fuel system airworthiness approval is the successful completion of a drop test. The drop test requirements include: (1) the drop height must be at least 50 feet; (2) the drop impact surface must be non-deforming; (3) the fuel tanks must be filled with water to 80 percent of the normal, full capacity or fuel to the full capacity; (4) the fuel tank must be enclosed in a surrounding structure representative of the installation unless it can be established that the surrounding structure is free of projections or other design features likely to contribute to rupture of the tank; (5) the fuel tank must drop freely and impact in a horizontal position+/−10 degrees; and (6) after the drop test, there must be no leakage. Fuel system tank assemblies for many vehicles must be vibration tested while mounted to simulate the actual installation.

SUMMARY

An exemplary cushion for a fuel system is constructed of a lattice structure formed of a material that is substantially nonabsorbent of fuel and has a network of nodes and beams defining cells, an exterior surface of the lattice structure is configured to be oriented toward a fuel cell and an interior surface of the lattice structure is configured to fit to a mounting surface. In an embodiment the exterior surface is a generally solid surface.

An exemplary fuel system includes a receiving assembly having a mounting surface to receive a fuel cell, a cushion constructed of a lattice structure positioned between the fuel cell and the mounting surface, the lattice structure formed of a material substantially nonabsorbent of fuel and having a network of nodes and beams defining cells, an exterior surface of the lattice structure oriented toward the fuel cell and an interior surface of the lattice structure fit to the mounting surface.

An exemplary aircraft includes a receiving assembly having a mounting surface to receive a fuel cell, the mounting surface including a floor and a wall, a floor cushion positioned between the floor and the fuel cell, a wall cushion positioned between the wall and the fuel cell, where the floor cushion and the wall cushion are each constructed of a lattice structure formed of a material substantially nonabsorbent of fuel and having a network of nodes and beams defining cells, an exterior surface of the lattice structure oriented toward the fuel cell and an interior surface of the lattice structure fit to the mounting surface.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
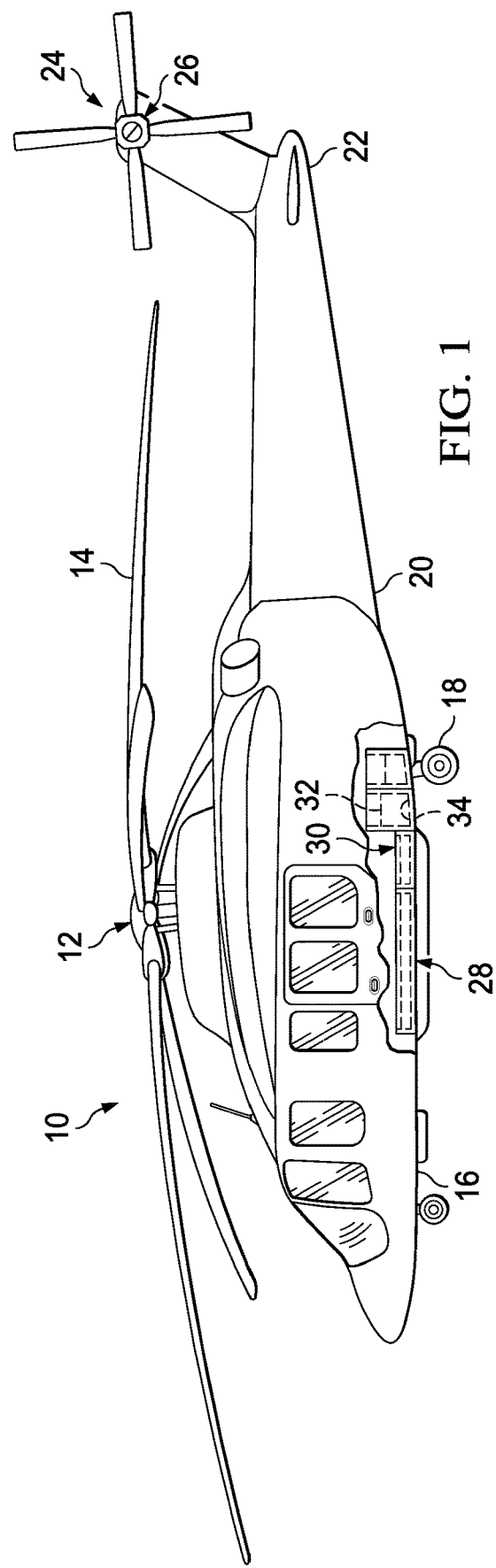
FIG. 1 is a schematic illustration of an exemplary aircraft implementing lattice structure cushions for fuel cell support.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Referring to FIG. 1, an exemplary rotorcraft is illustrated and generally designated 10. Rotorcraft 10 has a rotor hub assembly 12, which includes a plurality of rotor blade assemblies 14. Rotor hub assembly 12 is rotatable relative to a fuselage 16 of rotorcraft 10. The pitch of rotor blade assemblies 14 can be collectively and/or cyclically manipulated to selectively control direction, thrust and lift of rotorcraft 10. A landing gear system 18 provides ground support for rotorcraft 10. A tail boom 20, having an aft portion 22, extends from fuselage 16. A tail rotor 24 includes a tail rotor hub assembly 26 that is rotatably coupled to aft portion 22 of tail boom 20.

Rotorcraft 10 has a fuel system 28, including a fuel cell receiving assembly 30 located in a lower portion of fuselage 16. Fuel cell receiving assembly 30 is coupled to fuselage 16 and may be fully or partially integral with fuselage 16 or may be independent of but secured to fuselage 16. Fuel cell receiving assembly 30 contains or receives one or more fuel cells 32, such as fuel bags, each of which contain fuel. The fuel contained in fuel cells 32 is used as an energy source to power the various systems of rotorcraft 10, such as rotor hub assembly 12 and tail rotor hub assembly 26. The inner surface of fuel cell receiving assembly 30 includes one or more fuel cell cushions 34 interposed between fuel cells 32 and the inner surface of fuel cell receiving assembly 30 to provide a smooth, stable and non-damaging surface on which fuel cells 32 may rest. Fuel cell cushions 34 prevent protruding structures, such as fasteners, or other wear items from puncturing fuel cells 32 during a crash or wearing down or weakening fuel cells 32 over time. Fuel cell cushions 34 are constructed to prevent the absorption of fuel, thereby decreasing the risk of a fire. Thus, fuel cell cushions 34 protect the structural integrity of fuel cells 32 while resisting the absorption of fuel.

It should be appreciated that rotorcraft 10 is merely illustrative of a variety of aircraft that can implement the embodiments disclosed herein. Indeed, fuel system 28, including fuel cell cushions 34, may be utilized on any aircraft that uses fuel as an energy source. Other aircraft implementations can include hybrid aircraft, tiltrotor aircraft, tiltwing aircraft, quad tiltrotor aircraft, unmanned aircraft, gyrocopters, airplanes, jets and the like. As such, those skilled in the art will recognize that fuel cell cushions 34 can be integrated into a variety of aircraft configurations. It should be appreciated that even though aircraft are particularly well-suited to implement the embodiments of the present disclosure, non-aircraft vehicles and devices can also implement the embodiments.

Figure 2:
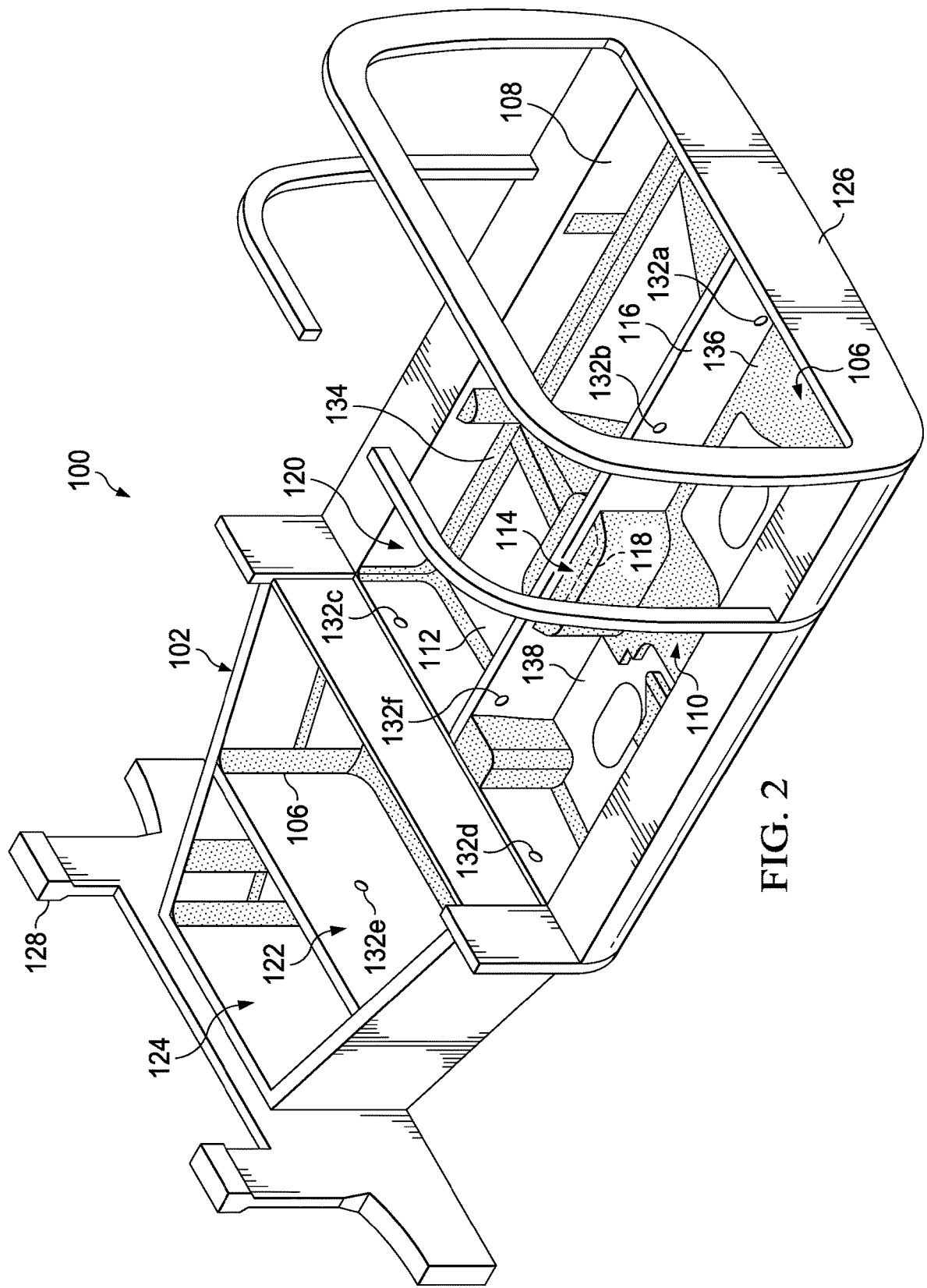
FIG. 2 illustrates an exemplary fuel cell receiving assembly implementing lattice structure cushions in accordance with aspects disclosed herein.
Figure 3A:
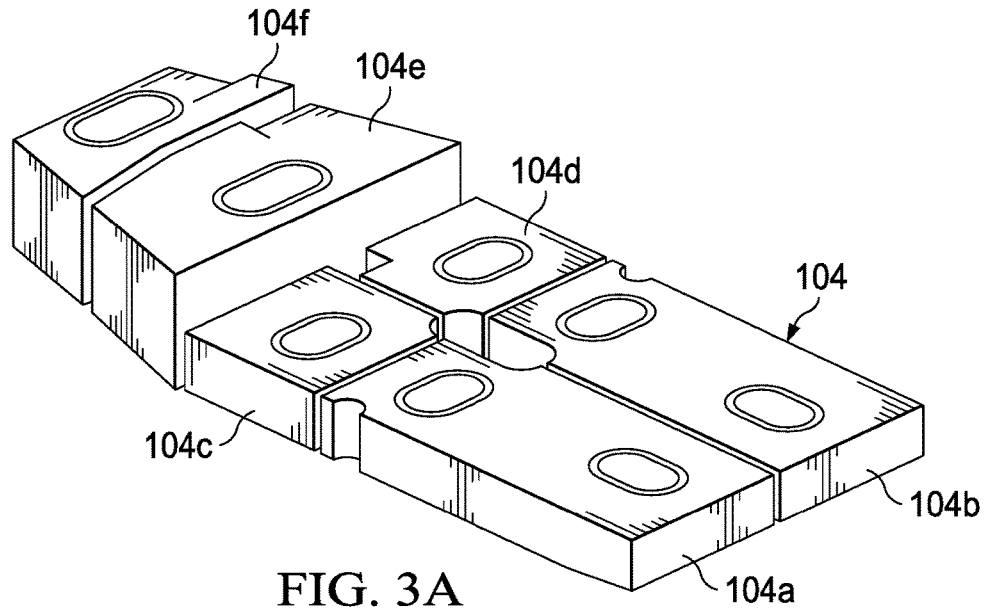
FIGS. 3A-3B illustrated exemplary fuel cells.
Figure 3B:
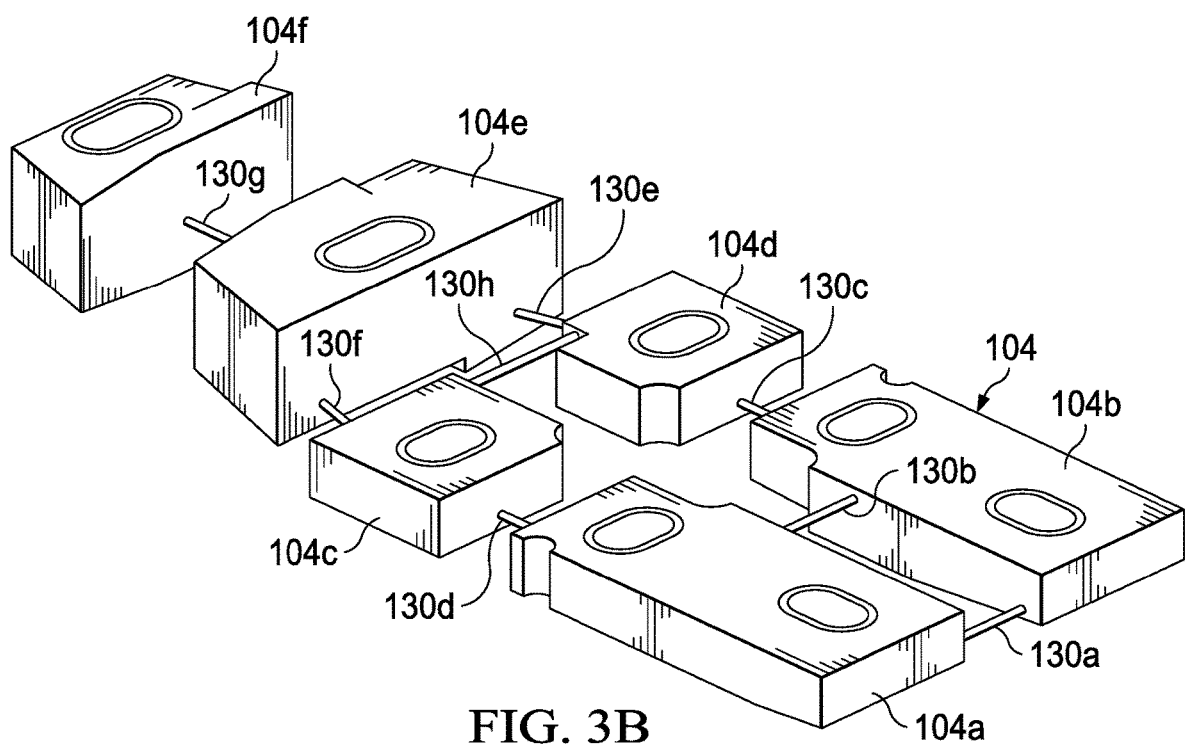

Referring in particular to FIGS. 2 and 3A-3B, an exemplary fuel system for an aircraft is schematically illustrated and generally designated 100. Fuel system 100 includes a fuel cell receiving assembly 102 that receives or contains fuel cells 104. Fuel cells 104 contain fuel. Fuel cell cushions 106 are interposed between inner surface 108 of fuel cell receiving assembly 102 and fuel cells 104. As further described below, fuel cell cushions 106 are formed of a lattice structure having a plurality of cells defined by nodes and beams. Fuel cell cushions are shaped for example to fit in a designated position in the receiving assembly.

Fuel cell cushions 106 include floor fuel cell cushions 110, which are disposed on a floor 112 of inner surface 108. Fuel cell cushions 106 also include wall fuel cell cushions 114, which are disposed on walls 116 of inner surface 108. The floor fuel cell cushions and the wall fuel cell cushions may be constructed of different density lattice structures, for example the wall fuel cell cushions may have a lower density lattice than the floor fuel cell cushions. Fuel cell cushions 106 at least partially surround fuel cells 104 to cushion, or protect, fuel cells 104 from damage caused by protrusions 118 in fuel cell receiving assembly 102 and from other hazards. Fuel cell cushions 106 support the weight of fuel cells 104 to minimize the displacement of fuel cells 104 and resist fuel absorption in case of a fuel leak. An exterior surface 134 of fuel cell cushions that contact fuel cells 104 may be smooth and non-abrasive to minimize chafing fuel cells 104. Fuel cell cushions 106 may also be tapered or shaped to bias, or direct, the flow of fuel within fuel cells 104 in a particular direction, such as toward an outlet or fuel pump. For example, floor fuel cell cushions 110 may be tapered from increasing to decreasing thickness from an edge of floor 112 to a middle portion 138 of floor 112 to bias the fuel in fuel cells 104 toward middle portion 138 of floor 112, where a fuel pump may be located.

Exemplary fuel cell receiving assembly 102 includes multiple compartments, including a forward compartment 120, a middle compartment 122 and an aft compartment 124. Fuel cell receiving assembly 102, including floor 112, walls 116, bulkheads 126, 128 and any supporting airframe structure, may be formed from a metal, such as aluminum, composite or other suitable material. It should be understood by those of ordinary skill in the art that fuel cell receiving assembly 102 may be constructed in any number of different manners including, but not limited to, as a single unitary assembly, as multiple unitary subassemblies such as a front subassembly, a middle subassembly and an aft subassembly, or in another suitable manner. Likewise, portions of fuel cell receiving assembly 102 could alternatively be formed by sections of keel beams connected to or integral with the fuselage of an aircraft, such as a pair of side keel beams and a central keel beam each of which extend in the longitudinal direction of fuel cell receiving assembly 102. Regardless of the specific manner of construction, important features of fuel cell receiving assembly 102 include being sized and shaped to operably receive and contain fuel cells 104 therein.

As shown in FIGS. 3A and 3B, fuel cells 104 include six interconnected fuel cells including forward cells 104a, 104b, feed cells 104c, 104d, mid cell 104e and aft cell 104f. As illustrated, the height of mid cell 104e and aft cell 104f is greater than that of forward cells 104a, 104b and feed cells 104c, 104d. The volume of fuel that may be stored in fuel cells 104 will depend on the particular implementation but will typically be on the order of several hundred to a thousand gallons. Compartments 120, 122, 124 of fuel cell receiving assembly 102 are each adapted to receive at least one of fuel cells 104. As illustrated, forward compartment 120 of fuel cell receiving assembly 102 receives forward cells 104a, 104b and feed cells 104c, 104d, middle compartment 122 of fuel cell receiving assembly 102 receives mid cell 104e and aft compartment 124 receives aft cell 104f. Even though fuel cells 104 have been described as having a particular number of fuel cells in a particular configuration, it should be understood by those of ordinary skill in the art that fuel cells 104 may have any number of fuel cells both less than or greater than six and fuel cells 104 may be arranged in any manner of different configurations depending upon the particular implementation. Likewise, fuel cell receiving assembly 102 may include any number of compartments to receive fuel cells 104. For example, fuel cell receiving assembly 102 may include one, two, eight or any other number of compartments.

As best seen in the exploded view of FIG. 3B, fuel cells 104 include one or more fluid interconnection lines 130a-130h, each of which may be coupled to any two of fuel cells 104 to provide fluid communication therebetween. As illustrated, two fluid interconnection lines 130a, 130b establish fluid communication between forward cells 104a, 104b. Fluid interconnection line 130a is operable to communicate a liquid, such as fuel, between forward cells 104a, 104b while fluid interconnection line 130b is a vent line operable to communicate a gas, such as air, between forward cells 104a, 104b. Also illustrated is fluid interconnection line 130c that establishes fluid communication between forward cell 104b and feed cell 104d, fluid interconnection line 130d that establishes fluid communication between forward cell 104a and feed cell 104c, fluid interconnection line 130e that establishes fluid communication between feed cell 104d and mid cell 104e, fluid interconnection line 130f that establishes fluid communication between feed cell 104c and mid cell 104e, fluid interconnection line 130g that establishes fluid communication between mid cell 104e and aft cell 104f and fluid interconnection line 130h that establishes fluid communication between feed cell 104c and feed cell 104d. Fluid interconnection lines 130c, 130d, 130e, 130f, 130g are operable to communicate liquids while fluid interconnection line 130h is a vent line operable to communicate a gas.

Some of fluid interconnection lines 130a-130h pass through apertures 132a-132f formed by walls 116 of fuel cell receiving assembly 102. As illustrated, fluid interconnection line 130a passes through aperture 132a, fluid interconnection line 130b passes through aperture 132b, fluid interconnection line 130e passes through aperture 132c, fluid interconnection line 130f passes through aperture 132d, fluid interconnection line 130g passes through aperture 132e and fluid interconnection line 130h passes through aperture 132f. During a crash impact or otherwise, none of fluid interconnection lines 130a-130h can become severed or separated from fuel cells 104 as this could result in fuel exiting fuel cells 104 and potentially igniting. Fuel cells 104 may be bags or bladders that are flexible, semi-rigid or rigid. In one non-limiting example, fuel cells 104 may be formed from Kevlar, among other materials. In other embodiments, fuel cells 104 may be tanks formed of a rigid material, such as metal, polymer, plastic or any other rigid material.

Fuel cell cushions heretofore have typically been formed of a foam material, which is difficult to fabricate, have a uniform density, are prone to damage, and require heavy, time consuming, coatings to resist fuel absorption. The shaped cushions disclosed herein are constructed of a lattice structure for example via additive manufacturing with various materials of construction to tailor the shape and density of the shaped cushion. For example, in areas of high compression loads, the lattice structure may have a higher density than areas subject to low compression loads. The depth or thickness of the shaped cushion in low compression load areas can be thinned and still prevent chafing between the fuel cell and the adjacent structure. Topology optimization methods may be used to define lattice shapes, orientations, and density to achieve the desired strengths and displacements and optimize weight to strength ratio.

Figure 4:
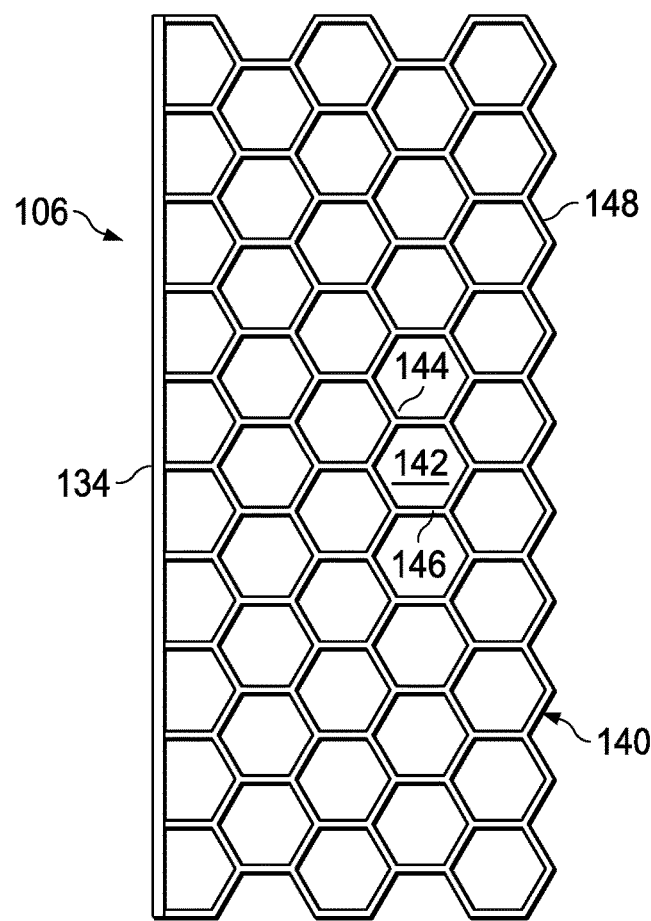
FIG. 4 is a schematic illustration of a portion of an exemplary lattice structure shaped cushion.

FIGS. 4-8 illustrate exemplary shaped cushions 106 that may be utilized as fuel cell cushions. FIG. 4 illustrates a portion of an exemplary shaped cushion 106. Shaped cushion 106 is a lattice structure 140 having a plurality of cells 142 defined by nodes 144 and beams 146. Lattice structure 140 may be constructed of various materials and in accordance to some embodiments the material is substantially nonabsorbent of fuel, e.g. liquid hydrocarbons. Without limitation, lattice structure 140 may be constructed of a polyurethane. Shaped cushion 106 may be formed by additive manufacturing to meet designed physical dimensions and contours as well as physical characteristics such as compressive strength, shear strength, elasticity, resilience, and chemical compatibility. Shaped cushion 106 may have a uniform cell density or a gradient density. The orientation of the cells may vary along the length and width of shaped cushion 106 to achieve desired strength characteristics.

For use as fuel cell cushion 106, lattice structure 140 has an exterior surface 134 oriented toward the fuel cell 104 and an interior surface 148 to fit an inner surface 108 of a fuel cell receiving assembly 102. Exterior surface 134 may be formed as a smooth, solid, surface to minimize chafing the fuel cell. A smooth surface may be formed by filling, and closing, cells 142 along exterior surface 134 via additive manufacturing. Interior surface 148 may be finished as a solid surface or exposed open cells 142.

Figure 5:
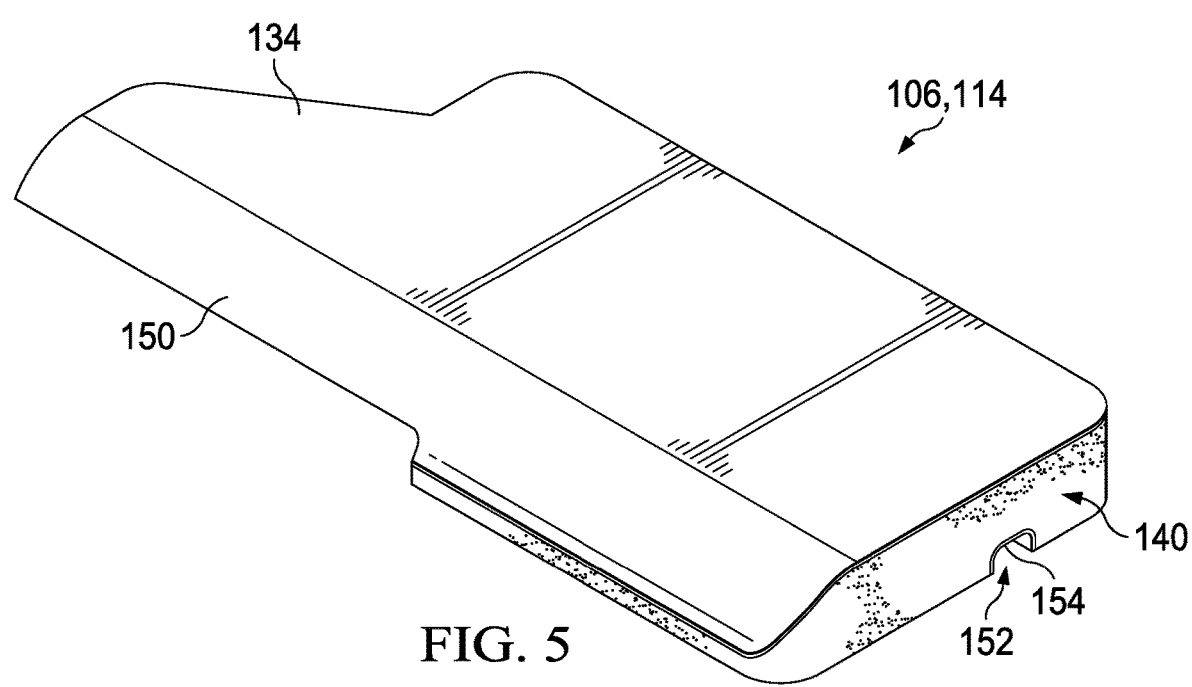
FIGS. 5 and 6 illustrate an exemplary lattice structure shaped cushion according to aspects of the disclosure.
Figure 6:
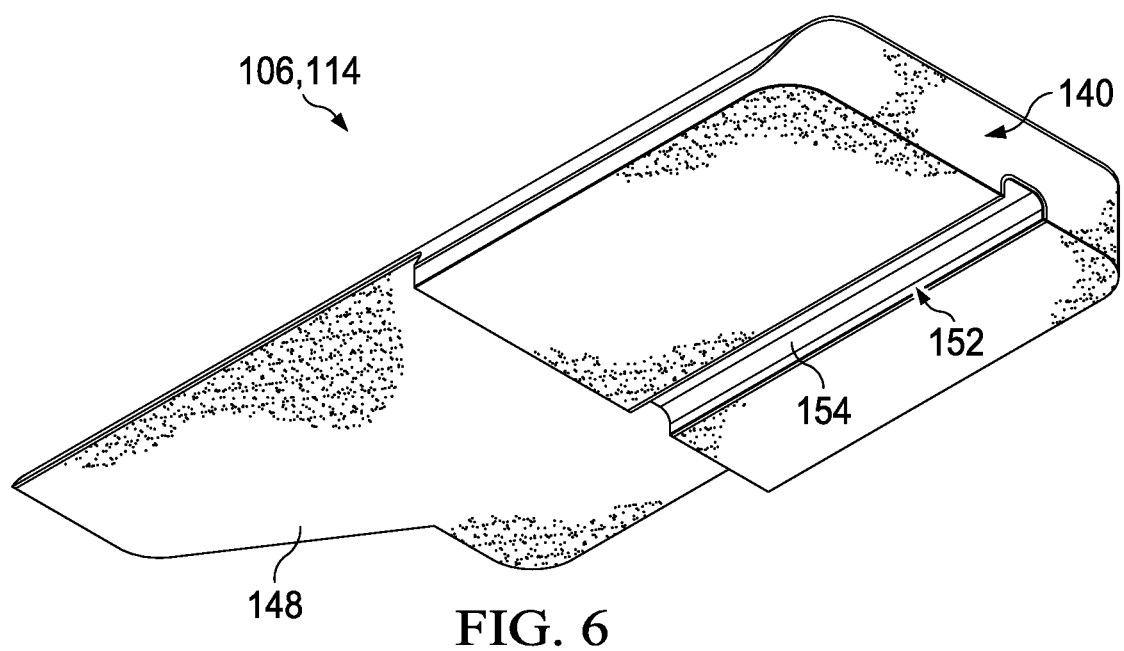

FIGS. 5 and 6 schematically illustrated an exemplary shaped cushion 106 configured for example to be used as a wall fuel cell cushion 114 as illustrated in FIG. 2. Exterior surface 134 is finished with a generally smooth and solid surface to minimize chafing of a fuel cell. The outer perimeter 150 and interior surface 148 are contoured to fit a designated location. Similarly the depth between exterior surface 134 and interior surface 148 may vary across shaped cushion 106. Cushion 106 may be formed in the desired shape via additive manufacturing without requiring the machining of a foam substrate. A smooth and solid exterior surface 134 can be formed via additive manufacturing that eliminates the time consuming process required with the typical machined foam substrate cushions.

In FIGS. 5 and 6, shaped cushion 106 has a recess 152 formed in interior surface 148 to dispose a protrusion 118 on mounting surface 108 (FIG. 2). Recess 152 may be lined with a solid surface 154, formed by lattice structure 140, to minimize catching of protrusion 118 on an open portion of lattice structure 140 or penetrating through the cushion and puncturing the fuel cell.

Figure 7:
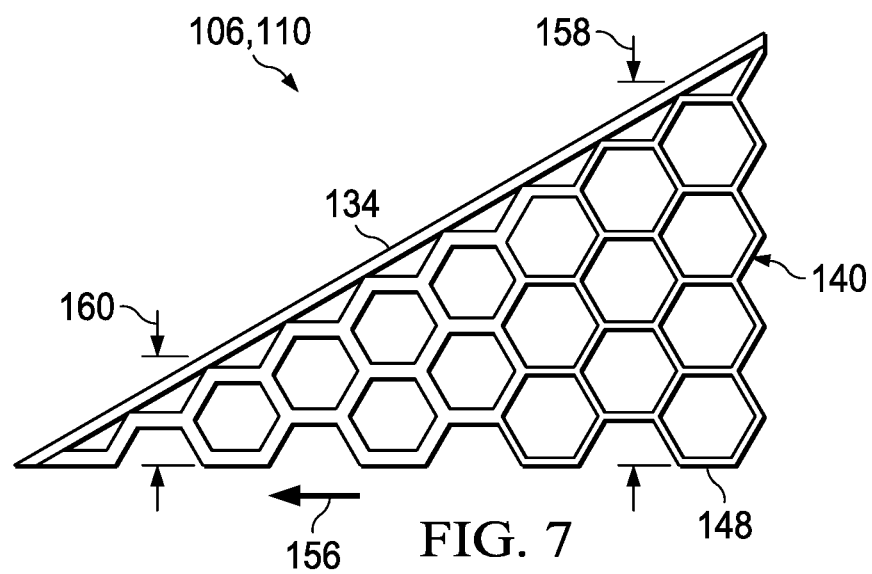
FIG. 7 illustrates another exemplary lattice structure shaped cushion according to aspects of the disclosure.

FIG. 7 illustrates an exemplary shaped cushion 106 configured as a floor fuel cell cushion 110. Shaped cushion 106 is constructed of a lattice structure 140 that is tapered in a first direction 156 from a first depth 158, between exterior surface 134 and interior surface 148, and a second depth 160. In this example, first depth 158 is greater than second depth 160. Shaped cushion 106 may be constructed with a gradient compressive strength to provide the necessary support for a fuel cell while providing a tapered surface for example to direct any uncontained fuel to a drain or reservoir. For example, the compressive strength of the lattice structure at the thinner portion may be greater than the compressive strength of the lattice structure at the thicker portion. The compressive strength may be varied by various means including changing the density of the lattice structure and/or the shape and orientation of the cells. In FIG. 7, lattice structure 140 has a gradient density tapered in first direction 156 from a lesser density at the greater first depth 158 to a greater density at the lesser second depth 160. Utilizing a gradient density and/or cell orientation facilitates achieving the desired strength and resiliency characteristics and minimizing the weight of the cushions.

Figure 8:
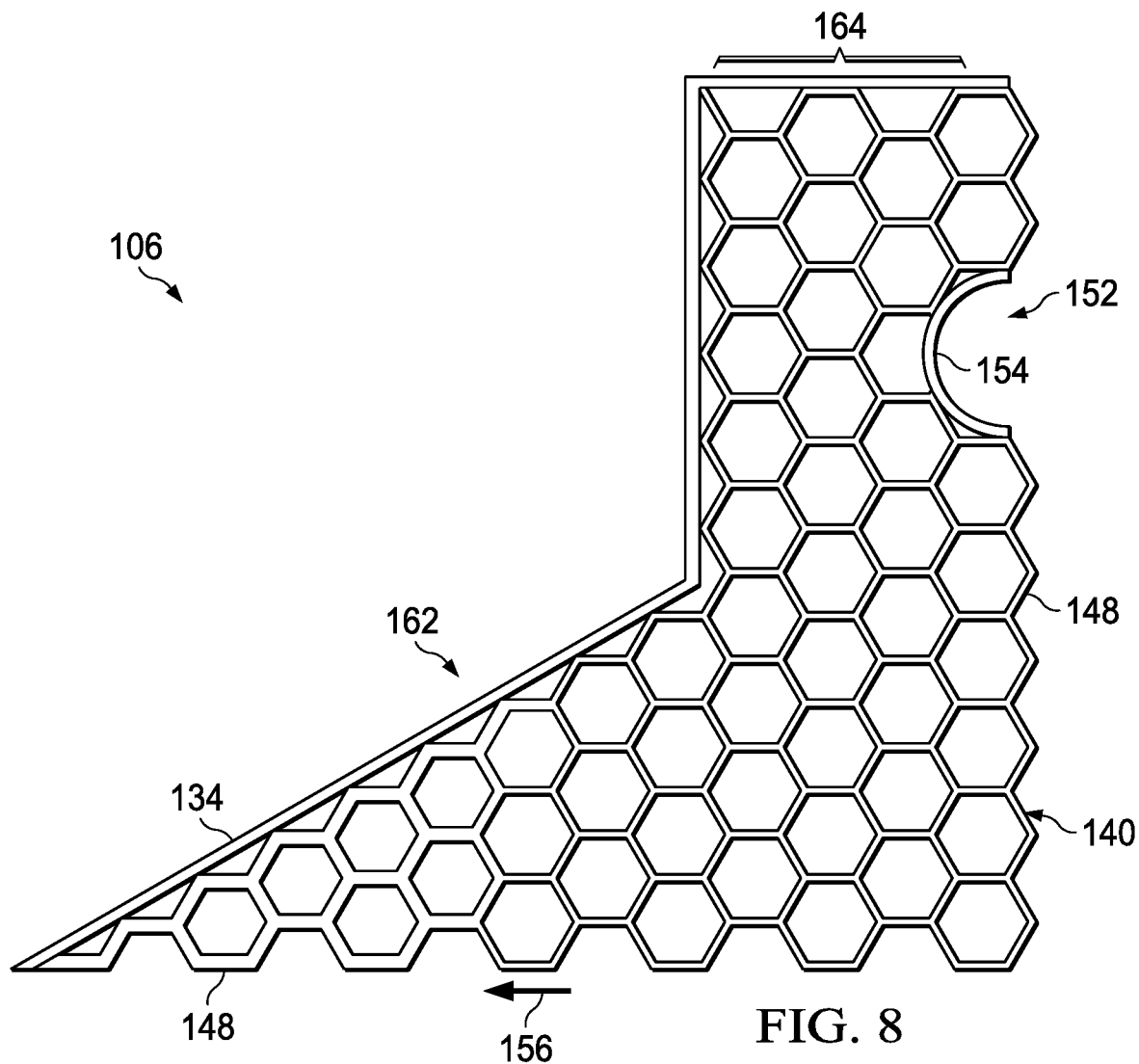
FIG. 8 illustrates another exemplary lattice structure shaped cushion according to aspects of the disclosure.

FIG. 8 illustrates another exemplary shaped cushion 106 constructed of a unitary, continuous, lattice structure 140 that has a floor portion 162 and a wall portion 164. Exterior surface 134 is a continuous surface extending along floor portion 162 and wall portion 164. Lattice structure 140 has as a smooth, solid, surface at exterior surface 134. In this example, floor portion 162 tapers in a first direction 156 from a greater depth, between exterior surface 134 and interior surface 148, to a lesser depth. Floor portion 162 has a gradient density. Wall portion 164 may have a different density than all or part of floor portion 162. In this example, a recess 152 is formed in interior surface 148 for disposing a protrusion on the mounting surface of the receiving assembly. Recess 152 may have a solid lining 154 formed by the lattice structure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A cushion for a fuel system, the cushion comprising:
   a unitary lattice structure with a gradient density having a floor portion and a wall portion shaped to fit between a mounting surface of a receiving assembly and a fuel cell, the unitary lattice structure formed of a material nonabsorbent of fuel and having a network of nodes and beams defining cells;
   an exterior surface of the unitary lattice structure configured to be oriented toward a fuel cell, wherein the exterior surface is a smooth, solid surface without any of the cells being open at the exterior surface; and
   an interior surface of the unitary lattice structure configured to fit the mounting surface, wherein some of the cells are open at the interior surface.

2. The cushion of claim 1, wherein the unitary lattice structure is tapered in a first direction from a first depth, between the exterior surface and the interior surface, that is greater than a second depth.

3. The cushion of claim 2, wherein the unitary lattice structure is tapered in the first direction from a lesser density at the first depth to a greater density at the second depth.

4. The cushion of claim 2, wherein the unitary lattice structure has a tapered compression strength from a lesser compression strength at the first depth to a greater compression strength at the second depth.

5. The cushion of claim 1, wherein the unitary lattice structure is formed via additive manufacturing.

6. The cushion of claim 1, wherein the interior surface has a recess to position a protrusion on the mounting surface.

7. A fuel system comprising:
   a receiving assembly having a mounting surface to receive a fuel cell;
   a cushion constructed of a unitary lattice structure having a floor portion and a wall portion with a continuous exterior surface, the cushion positioned between the fuel cell and the mounting surface, structure formed of a material nonabsorbent of fuel and having a network of nodes and beams defining cells;
   an exterior surface of the unitary lattice structure oriented toward the fuel cell, wherein the exterior surface is a smooth, solid surface without any of the cells being open at the exterior surface; and
   an interior surface of the unitary lattice structure fit to the mounting surface, wherein some of the cells are open at the interior surface:
   wherein the floor portion is tapered in a first direction from a first depth, between the exterior surface and the interior surface, that is greater than a second depth; and
   the floor portion has a gradient density tapered in the first direction from a lesser density at the first depth to a greater density at the second depth.

8. The fuel system of claim 7, wherein the unitary lattice structure is tapered in a first direction from a first depth, between the exterior surface and the interior surface, that is greater than a second depth; and
   the unitary lattice structure has a gradient density tapered in the first direction from a lesser density at the first depth to a greater density at the second depth.

9. An aircraft, comprising:
- a receiving assembly having a mounting surface to receive a fuel cell, the mounting surface including a floor and a wall;
- a floor cushion positioned between the floor and the fuel cell;
- a wall cushion positioned between the wall and the fuel cell; and
- the floor cushion and the wall cushion each constructed of a lattice structure formed of a material nonabsorbent of fuel and having a network of nodes and beams defining cells;
- an exterior surface of the lattice structure oriented toward the fuel cell, wherein the exterior surface is a smooth, solid surface without any of the cells being open at the exterior surface; and
- an interior surface of the lattice structure fit to the mounting surface, wherein some of the cells are open at the interior surface.

10. The aircraft of claim 9, wherein the lattice structure is formed via additive manufacturing.

11. The aircraft of claim 9, wherein the floor portion is tapered in a first direction from a first depth, between the exterior surface and the interior surface, that is greater than a second depth.

12. The aircraft of claim 9, wherein the floor portion is tapered in a first direction from a first depth, between the exterior surface and the interior surface, that is greater than a second depth; and
- the floor portion has a gradient density tapered in the first direction from a lesser density at the first depth to a greater density at the second depth.

13. The aircraft of claim 12, wherein the lattice structure is formed via additive manufacturing;
- the floor portion is tapered in a first direction from a first depth, between the exterior surface and the interior surface, that is greater than a second depth; and
- the wall portion has a recess to position a protrusion on the wall and the recess is defined by a smooth, solid surface.

\* \* \* \* \*